May 31, 1949.
H. W. LORD
2,471,826
ELECTRONIC CONTROL CIRCUIT FOR
PERFORMING A TIMING FUNCTION
Filed Aug. 21, 1944
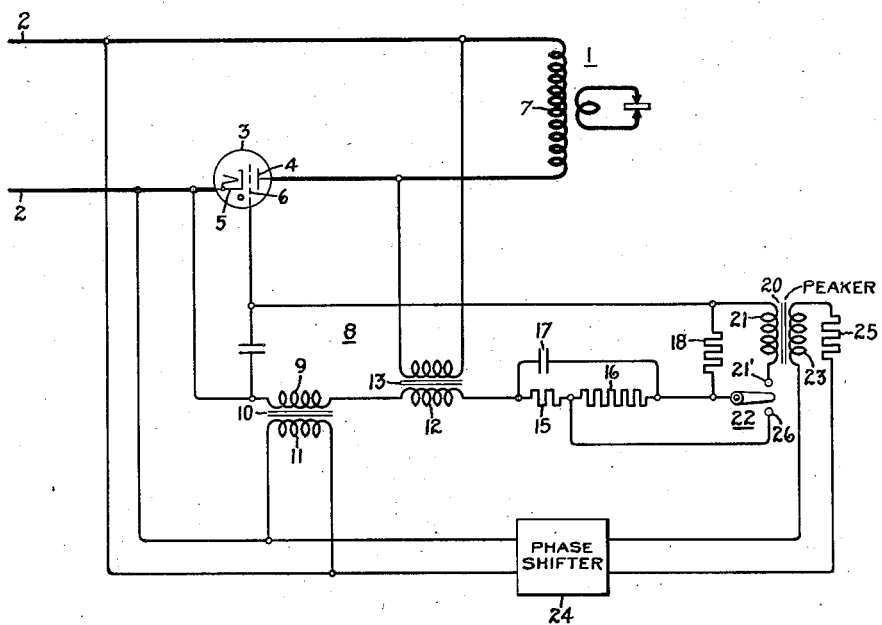
Inventor:
Harold W. Lord,
by Harry E. Dunham
His Attorney.

Patented May 31, 1949

2,471,826

UNITED STATES PATENT OFFICE 2,471,826

ELECTRONIC CONTROL CIRCUIT FOR PERFORMING A TIMING FUNCTION

Harold W. Lord, Schenectady, N. Y., assignor to General Electric Company, a corporation of New York Application August 21, 1944, Serial No. 550,352

5 Claims. (Cl. 250—27)

1

My invention relates to electric control circuits and more particularly to improved electric control circuits for performing a timing function.

In certain industrial applications, it is desirable to supply a pulse of current to a load circuit having a predetermined duration such as a half cycle, and to prevent the supply of additional current to the load circuit until the control is reset or for a predetermined interval. The load circuit may, for example, be the operating coil of a relay, the transformer of a resistance welding machine, or the transformer of a magnetizer. In accordance with the teachings of the present invention, I provide a new and improved circuit of the above type requiring a minimum of equipment and capable of effecting the energization of the load with a single pulse only or with a succession of pulses at accurately timed intervals.

It is an object of my invention to provide a new, improved, and simplified electric control circuit.

It is another object of my invention to provide a new and improved electric control for supplying a pulse of current of predetermined duration to a load circuit.

It is a further object of my invention to provide a new and improved electric control circuit for supplying a single pulse of current to a load circuit at accurately spaced intervals.

In the illustrated embodiment of my invention, a resistance welding transformer is energized with pulses of current of a half cycle, or a portion of a half cycle duration under the control of an electric valve having a control member energized in a novel manner. The valve is normally maintained nonconducting by a hold-off voltage and is rendered conducting at a predetermined point in a half cycle of the supply circuit voltage by means of a peaking transformer which is effectively connected in the excitation circuit of the electric valve under the control of an initiating switch. In order to maintain the valve nonconductive following a half cycle of conduction, a capacitor and a feed-back transformer, for impressing a positive voltage on the control member of the electric valve, are connected in series with the control member. During a half cycle of conduction by the electric valve the feed-back transformer provides a source of voltage for charging the capacitor through the grid circuit of the valve to a substantial negative voltage and in this manner to maintain the valve nonconductive until the voltage of the capacitor reduces to a predetermined value. The rate at which the capacitor voltage reduces is determined

2 by an adjustable resistance in shunt with the capacitor. If the initiating switch is retained in the closed position, a succession of half cycle pulses is delivered to the load at intervals determined by the discharge of the capacitor. If it is desired to use the novel circuit of the control member as a lockout, the discharge circuit of the capacitor is of sufficiently high resistance to maintain the valve nonconductive as long as the initiating switch would normally remain closed. In such case in order to reset the system so that it may be operated to supply another impulse under the control of the initiating switch, provision is made for moving the initiating switch to a reset position to establish a low impedance path for the discharge of the capacitor.

For a better understanding of my invention, reference may be had to the following description taken in connection with the accompanying drawing in which the single figure is a schematic representation of one embodiment of my invention.

Referring now to the drawing, I have shown my invention embodied in a control circuit for energizing a load circuit such as a resistance welding transformer 1 from an alternating current supply circuit 2. As illustrated, an electric valve 3, preferably of the gas or vapor filled type, and including an anode 4, a cathode 5, and a control member or grid 6, is connected with its anode-cathode circuit in series with the supply circuit 2 and the primary winding 7 of the welding transformer 1.

The conductivity of the electric valve 3 is controlled by an excitation circuit designated generally by numeral 8. An alternating hold-off voltage is impressed on the control member 6 of electric valve 3 by the secondary winding 9 of a transformer 10 having the primary winding energized from the supply circuit 2. A positive voltage, dependent upon conduction by electric valve 3, is impressed on the grid 6 of this valve by a secondary winding 12 of a feed-back transformer 13 having a primary winding energized by the voltage of the primary winding 7 of the welding transformer 1. The cathode-to-grid circuit is completed through windings 9 and 12, a biasing circuit including resistors 15 and 16 in series and in parallel with capacitor 17 and a resistor 18. A peaking transformer 20 is provided with a secondary winding 21 arranged to be connected across the resistor 18 by closure of an initiating contact 21' of a switching device 22. The peaking transformer may be of any suitable type and as illustrated is of the resistance type having the primary winding 23 thereof energized from the output of a phase shifter 24 through a resistance 25. The phase shifter may be any one of the well known types and is connected to be energized from the supply circuit 2. In order to provide for rapid resetting of the system, switch 22 is provided with a resetting contact 26 to establish a discharge path for capacitor 17 including only resistance 15. This resistor is chosen to limit the current to a suitable value, and in most cases will be very much smaller than resistor 16 which may be considered a timing resistor.

The features and advantages which characterize my invention will be better understood by a brief consideration of the operation of the embodiment described above. With the supply circuit 2 energized, the cathode of valve 3 at proper operating temperature and with switch 22 open, valve 3 is maintained nonconducting by the hold-off bias of winding 9 and whatever negative voltage may remain on capacitor 17. Upon closure of switch contact 21', a peaked voltage is impressed across resistor 13 to render the electric valve conductive at an instant dependent upon the setting of the phase shifter 24 and the magnitude of the resistance 25. As soon as the valve 3 conducts, the welding transformer 1 is energized. The feed-back transformer 13 is also energized to impress a positive voltage component on the grid of valve 3 which is substantially larger than the excess of the peaked voltage over the alternating hold-off voltage. As a result of the feed-back voltage, capacitor 17 charges through the internal grid-to-cathode circuit of valve 3 to a negative voltage of sufficient magnitude to maintain valve 3 nonconducting with switch contact 21' closed. If a plurality of time displaced half cycle pulses of current to the load are desired for each closure of switch contact 21', timing resistor 16 is chosen or adjusted so that valve 3 will again become conductive at the end of the desired time interval. If it is desired to obtain only a single pulse for each closure of switch contact 21', resistor 16 is adjusted to such a value that capacitor 17 maintains the valve 3 nonconductive for any expected closure period of switch contact 21'. With this adjustment, when it is desired to supply a pulse of current to the load the circuit is first reset by momentarily closing resetting contact 26 of switch 22.

In the above description only one valve has been illustrated and the pulses are therefore unidirectional or half wave pulses. It will be understood that a pair of reversely connected electric valves may be employed in leading and trailing relationship and with the illustrated control applied to the leading valve. With such an arrangement full wave pulses will be supplied to the load circuit.

While I have shown and described a particular embodiment of my invention, it will be obvious to those skilled in the art that changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. In combination, an alternating current supply circuit, a load circuit, electric translating apparatus interconnecting said circuits including electric valve means of the gas-filled type and including an anode, a cathode and a control member, means for impressing an alternating current hold-off voltage on said control member, means for impressing a periodic voltage of steep wave front on said control member to render the anode-to-cathode circuit of said electric valve means conductive at a predetermined instant during a half wave of voltage of said supply circuit and for removing said periodic voltage from said control element, a capacitor permanently connected in the external cathode-to-control member circuit of said electric valve means, a transformer having a primary winding connected in the anode-to-cathode circuit of said electric valve means and having a secondary winding whose output voltage is substantially larger than the excess of said periodic voltage over said alternating current hold-off voltage, said secondary winding of said transformer being connected in the external cathode-to-control member circuit of said electric valve means in series with said capacitor for impressing a positive value of its output voltage on said control member of said electric valve means to charge said capacitor through the internal cathode-to-control member circuit of said electric valve means to a voltage of sufficient magnitude to maintain the anode-to-cathode circuit of said electric valve means nonconductive for a predetermined interval following each anode-to-cathode conduction by said valve means and regardless of the presence of said periodic voltage, and a discharge circuit continuously tending to discharge said capacitor at a rate which determines the duration of said interval.

2. In combination, an alternating current supply circuit, a load circuit, electric translating apparatus interconnecting said circuits including electric valve means of the gas-filled type and including an anode, a cathode and a control member, switching means movable to a plurality of operative positions, means including said switching means in one of its operative positions for impressing a periodic voltage of steep wave front on said control member to render the anode-to-cathode circuit of said electric valve means conductive at a predetermined instant during a half wave of voltage of said supply circuit, a capacitor connected in the external cathode-to-control member circuit of said electric valve means, means responsive to anode-to-cathode conduction by said electric valve means for charging said capacitor through the internal cathode-to-control member circuit of said electric valve means to a voltage of sufficient magnitude to maintain the anode-to-cathode circuit of said electric valve means nonconductive for a predetermined interval following each anode-to-cathode conduction by said valve means and regardless of the presence of said periodic voltage, a discharge circuit continuously tending to discharge said capacitor at a rate which determines the duration of said interval, and means including said switching means in another of its operative positions for removing said periodic voltage from said control member of said electric valve means and for establishing a low impedance discharge circuit for said capacitor.

3. In combination, an alternating current supply circuit, a load circuit, electric translating apparatus interconnecting said circuits including electric valve means of the gas-filled type and including an anode, a cathode and a control member, means for impressing a periodic voltage of steep wave front on said control member to render the anode-to-cathode circuit of said electric valve means conductive at a predetermined instant during a half wave of voltage of said supply circuit, a capacitor connected permanently in the external cathode-to-control member circuit of said electric valve means, means responsive to anode-to-cathode conduction by said electric valve means for charging said capacitor through the internal cathode-to-control member circuit of said electric valve means to a voltage of sufficient magnitude to maintain the anode-to-cathode circuit of said electric valve means nonconductive for a predetermined interval following each anode-to-cathode conduction by said electric valve means and regardless of the presence of said periodic voltage, a discharge circuit continuously tending to discharge said capacitor at a rate which determines the duration of said interval, and means for removing said periodic voltage from said control member and for decreasing the impedance of said discharge circuit to reduce rapidly the voltage of said capacitor and condition said external cathode-to-control member circuit of said electric valve means for again initiating anode-to-cathode conduction of said electric valve means upon reapplication of said periodic voltage to said control member.

4. In combination, an alternating current supply circuit, a load circuit, electric translating apparatus interconnecting said circuits including electric valve means having a control member, means including switching means for impressing a turn-on voltage on said control member to render said electric valve means conducting at a predetermined instant in the voltage wave of said supply circuit, a transformer winding and a capacitor permanently connected in series with the external cathode-to-control member circuit of said electric valve means, means for energizing said transformer winding in response to conduction by said electric valve means to effect charge of said capacitor through the internal cathode-to-control member circuit of said electric valve means whereby said capacitor impresses a negative voltage on said control member to maintain said electric valve means nonconducting following each conduction thereby regardless of the presence of said turn-on voltage, a discharge circuit continuously tending to discharge said capacitor to permit a succeeding conduction by said electric valve means at the expiration of an interval dependent upon the impedance of said discharge circuit, and means including said switching means for removing said turn-on voltage and establishing a low impedance discharge circuit for said capacitor.

5. In combination, an alternating current supply circuit, a load circuit, electric translating apparatus interconnecting said circuits including electric valve means having an anode, a cathode and a control member, means for impressing an alternating hold-off voltage on said control member, an impedance element connected in circuit with said control member, means including switching means for impressing a turn-on voltage on said impedance element to render the anode-to-cathode circuit of said electric valve means conducting at a predetermined instant in the voltage wave of said supply circuit, a capacitor permanently connected in circuit with said control member, means for charging said capacitor in response to anode-to-cathode conduction by said electric valve means to maintain the anode-to-cathode circuit of said electric valve means nonconducting following each anode-to-cathode conduction thereby regardless of the presence of said turn-on-voltage, a discharge circuit continuously tending to discharge said capacitor to permit a succeeding anode-to-cathode conduction by said electric valve means at the expiration of an interval dependent upon the impedance of said discharge circuit, and means including said switching means for removing said turn-on voltage and establishing a low impedance discharge circuit for said capacitor.

HAROLD W. LORD.

REFERENCES CITED

The following references are of record in the file of this patent:

UNITED STATES PATENTS

| Number | Name | Date |
| --- | --- | --- |
| 2,126,398 | Knowles | Aug. 9, 1938 |
| 2,132,264 | King | Oct. 4, 1938 |
| 2,174,386 | King | Sept. 26, 1939 |
| 2,190,514 | Garman | Feb. 13, 1940 |
| 2,289,321 | Collom | July 7, 1942 |
| 2,367,940 | Gulliksen | Jan. 23, 1945 |